US012576607B2

(12) United States Patent
Hardy et al.

(10) Patent No.: US 12,576,607 B2
(45) Date of Patent: Mar. 17, 2026

(54) SPLICE-MATCH BUILDER

(71) Applicant: BRIDGESTONE BANDAG, LLC, Muscatine, IA (US)

(72) Inventors: Robert P. Hardy, Muscatine, IA (US); Eric M. Henriksen, Muscatine, IA (US); Aaron M. McCombs, Muscatine, IA (US); Zachary A. Milliron, Muscatine, IA (US); Jeremiah J. Nartker, Muscatine, IA (US); Jeffrey A. Wachtel, Muscatine, IA (US); Merle R. Schlapkohl, Muscatine, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 379 days.

(21) Appl. No.: 17/774,448

(22) PCT Filed: Nov. 4, 2020

(86) PCT No.: PCT/US2020/058844
§ 371 (c)(1),
(2) Date: May 4, 2022

(87) PCT Pub. No.: WO2021/091985
PCT Pub. Date: May 14, 2021

(65) Prior Publication Data
US 2022/0402228 A1 Dec. 22, 2022

Related U.S. Application Data

(60) Provisional application No. 62/931,366, filed on Nov. 6, 2019.

(51) Int. Cl.
*B29D 30/54* (2006.01)

(52) U.S. Cl.
CPC ........ *B29D 30/54* (2013.01); *B29D 2030/546* (2013.01)

(58) Field of Classification Search
CPC ........ B29D 30/52; B29D 30/54; B29D 30/56; B29D 30/58; B29D 2030/2671;
(Continued)

(56) References Cited

U.S. PATENT DOCUMENTS

| | | | |
|---|---|---|---|
| 3,017,312 A | 1/1962 | Kraft | |
| 3,411,975 A * | 11/1968 | Rowe | B29D 30/58 |
| | | | 156/96 |

(Continued)

FOREIGN PATENT DOCUMENTS

| | | |
|---|---|---|
| CN | 1160790 A | 10/1997 |
| CN | 1655922 A | 8/2005 |

(Continued)

OTHER PUBLICATIONS

Fujimoto M, JP-08309880-A, machine translation. (Year: 1996).*
(Continued)

*Primary Examiner* — Sedef E Paquette

(57) ABSTRACT

Disclosed herein, a tire tread cutting apparatus for cutting a length of a tire tread is described. The tire tread cutting apparatus includes a track having a first track end and a second track end downstream of the first track end. The track includes a plurality of rollers positioned between the first track end and the second track end. The plurality of rollers is configured to facilitate the tire tread along the track. A tire hub is positioned downstream of and adjacent to the second track end. The tire hub is configured to receive a tire casing. The tire casing defines a tire casing circumference along an outer surface of the tire casing. A tread dispenser is positioned upstream of the track and configured to dispense tire (Continued)

tread. The tread dispenser includes a drive roller configured to drive tire tread downstream toward the second track end.

9 Claims, 7 Drawing Sheets

(58) Field of Classification Search

CPC .... B29D 2030/2678; B29D 2030/2685; B29D 2030/2692; B29D 2030/544; B29D 2030/546

USPC .................................. 156/95, 96, 128.1, 909

See application file for complete search history.

(56) References Cited

U.S. PATENT DOCUMENTS

| | | | |
|---|---|---|---|
| 6,758,931 B1 | 7/2004 | Daugherty et al. | |
| 2011/0186198 A1 | 8/2011 | Cerny | |

FOREIGN PATENT DOCUMENTS

| | | | | | | |
|---|---|---|---|---|---|---|
| CN | 105121144 | | 12/2015 | | | |
| EP | 0 309 600 | A1 | 4/1989 | | | |
| EP | 1 120 235 | A2 | 8/2001 | | | |
| JP | H740463 | A | 2/1995 | | | |
| JP | 08309880 | A | * | 11/1996 | | |
| JP | 2002-086587 | | 3/2002 | | | |
| JP | 2002-086589 | A | 3/2002 | | | |
| JP | 2009-160882 | | 7/2009 | | | |
| KR | 20000006898 | U | 4/2000 | | | |
| KR | 20180062877 | A | 6/2018 | | | |
| KR | 201800662877 | A | 6/2018 | | | |
| KR | 1020180062877 | | 6/2018 | | | |
| KR | 20190067598 | A | 6/2019 | | | |
| KR | 1020190067598 | | 6/2019 | | | |
| WO | WO-2018056482 | A1 | * | 3/2018 | ............ | B29D 30/00 |

OTHER PUBLICATIONS

Jeong S J, WO-2018056482-A1, machine translation. (Year: 2018).*
Office Action for BR112022008727-6, dated Oct. 31, 2023, pp. 1-4.
Supplementary European Search Report for EP Application No. 20884165, dated Oct. 18, 2023.
International Search Report and Written Opinion for PCT Application No. PCT/US2020/058844, dated Feb. 26, 2021.
Office Action for CN Application No. 202080082057.4, dated Feb. 29, 2024, pp. 1-8.
Office Action for CN Application No. 202080082057.4, dated Aug. 31, 2024.

* cited by examiner

SPLICE-MATCH BUILDER

CROSS-REFERENCE TO RELATED PATENT APPLICATIONS

This application is a U.S. national stage entry of PCT/US2020/058844 filed Nov. 4, 2020 and claims the benefit of and priority to U.S. Provisional Application Ser. No. 62/931,366, filed on Nov. 6, 2019, the contents of which are incorporated herein by reference in their entirety.

BACKGROUND

The present application relates generally to the field of pneumatic tires, and more particularly, but not by way of limitation, making retreaded tires.

Removal of old tread from a tire casing provides a generally smooth and treadless surface about the circumference of the tire casing. The tire casing may then be examined for injuries, which are skived and filled with a repair gum. After completion of the skiving process, the buffed surface may be sprayed with a tire cement that provides a tacky surface for application of bonding material and a new tread. Next, a layer of cushion gum is applied to the back (i.e., the inside surface of a new layer of tread) or alternatively, the layer of cushion gum is applied directly to the tacky surface on the tire casing. Conventionally, the cushion gum is a layer of uncured rubber material. The cushion gum and tread may be applied in combination about the circumference of the tire casing to create a retreaded tire assembly ready for curing. Alternatively, a length of tire tread is wrapped around the tire casing with the cushion gum already applied. The cushion gum forms the bond between the tread and the tire casing during curing.

Following assembly of the tire casing, cement, cushion gum, and tread, the overall retreaded tire assembly is placed within a flexible rubber envelope. An airtight seal is created between the envelope and the bead of the tire. The entire envelope tire assembly is placed within a curing chamber and subjected to pressure and a raised temperature for a specific period of time. The combination of pressure, temperature, and time binds a layer of cushion gum to both the tire casing and the new tire tread.

The above-described method of cold process retreading is often accomplished on a tire builder. Conventional tire builders include a spindle on which a tire is mounted and a spindle on which a roll of tire cushion gum is mounted for dispensing. Typically the cushion gum may be dispensed by hand as the tire is rotated to adhere the cushion gum to the tire casing. In certain applications, it may be advantageous to eliminate the spray cement completely. This may be particularly true in geographical areas where there is increased regulation of the use of chemicals within spray cement products. Further, use of spray cement can also add to the cost of producing retreaded tires due to the product cost and equipment cost. Various solutions to enable a cementless process have been suggested, such as extruding heated cushion gum directly to a tire casing. This process, however, is costly due to equipment costs and is unnecessarily complex.

In conventional tire bench systems, after the cushion gum has been applied, the circumference of the tire casing with cushion gum is measured and an applicable length of tread is measured out, conventionally on a separate bench. The tire tread is manually cut to length. Once the cushion gum has been applied and the tread has been cut to length, the tread must be applied to the cushion gum and casing. Due to errors in the cut length of the tire tread it may be desirable to stretch the tire tread around the perimeter of the tire casing and cushion gum in order to create an appropriately sized splice.

SUMMARY

In a first set of embodiments, a tire tread cutting apparatus for cutting a length of a tire tread is described. The tire tread cutting apparatus includes a track having a first track end and a second track end downstream of the first track end. The track includes a plurality of rollers positioned between the first track end and the second track end. The plurality of rollers is configured to facilitate the tire tread along the track. A tire hub is positioned downstream and adjacent the second track end. The tire hub is configured to receive a tire casing. The tire casing defines a tire casing circumference along an outer surface of the tire casing. A tread dispenser is upstream of the track and configured to dispense tire tread. The tread dispenser includes a drive roller configured to drive tire tread downstream toward the second track end. The tire tread has a first tread end and a roll end. The tire tread has a tire roll length defined by the first tread end and the roll end. The tire roll length is greater than the tire casing circumference length. A cutting element is downstream of the tread dispenser and upstream of the track. The cutting element is for cutting the tire tread to define a second tread end. The first tread end adhered to the tire casing and the second tread end define a section of tire tread. The second tread end is determined based on a measurement of the tire casing circumference. At least the first tread end is adhered to the outer surface of the tire casing when the second tread end is cut.

In a second set of embodiments, a method of cutting a length of tire tread for a retread tire having a tire casing is described. The method includes measuring a circumference of the tire casing and cushion gum positioned on a tire hub. Tire tread is dispensed from a tread dispenser along a track upstream of the tire hub. The tire tread has a first tread end and a tread length. The tread length is defined by a distance between the first tread end and a tire tread roll upstream of the tread dispenser. The first tread end is conveyed toward the tire casing along the track. The first tread end of the tire tread is adhered to an outer surface of the tire casing and cushion gum positioned on a tire hub. A second tread end is determined. The second tread end is determined based on the measurement of the tire casing circumference. The tire tread is cut at the second tread end to define a section of tire tread. The section of tire tread is defined by the first tread end adhered to the tire casing and the second tread end.

In a third set of embodiments, a tire tread cutting apparatus for cutting a length of a tire tread is described. The tire tread cutting apparatus includes a track having a first track end and a second track end downstream of the first track end. The track includes a plurality of rollers positioned between the first track end and the second track end. The plurality of rollers is configured to facilitate the tire tread along the track. A tire hub is positioned downstream and adjacent the second track end. The tire hub is configured to receive a tire casing. The tire casing includes a cushion gum layer to define a tire casing circumference along an outer surface of the tire casing. A tread dispenser is upstream of the track and configured to dispense tire tread. The tread dispenser includes a drive roller configured to drive tire tread downstream toward the second track end. The tire tread has a leading end and a tread length. The tread length is defined by a distance between the leading end and a tire tread roll upstream of the tread dispenser. A cutting element is downstream of the tread dispenser and upstream of the track. The cutting element is for splicing the tire tread to define a trailing end. The leading end adhered to the tire casing and the trailing end defines a section of tire tread. The trailing end is determined based on a measurement of the tire casing circumference. At least the leading end is adhered to the outer surface of the tire casing when the trailing end is cut. The section of tire tread has a length shorter than the tread length.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
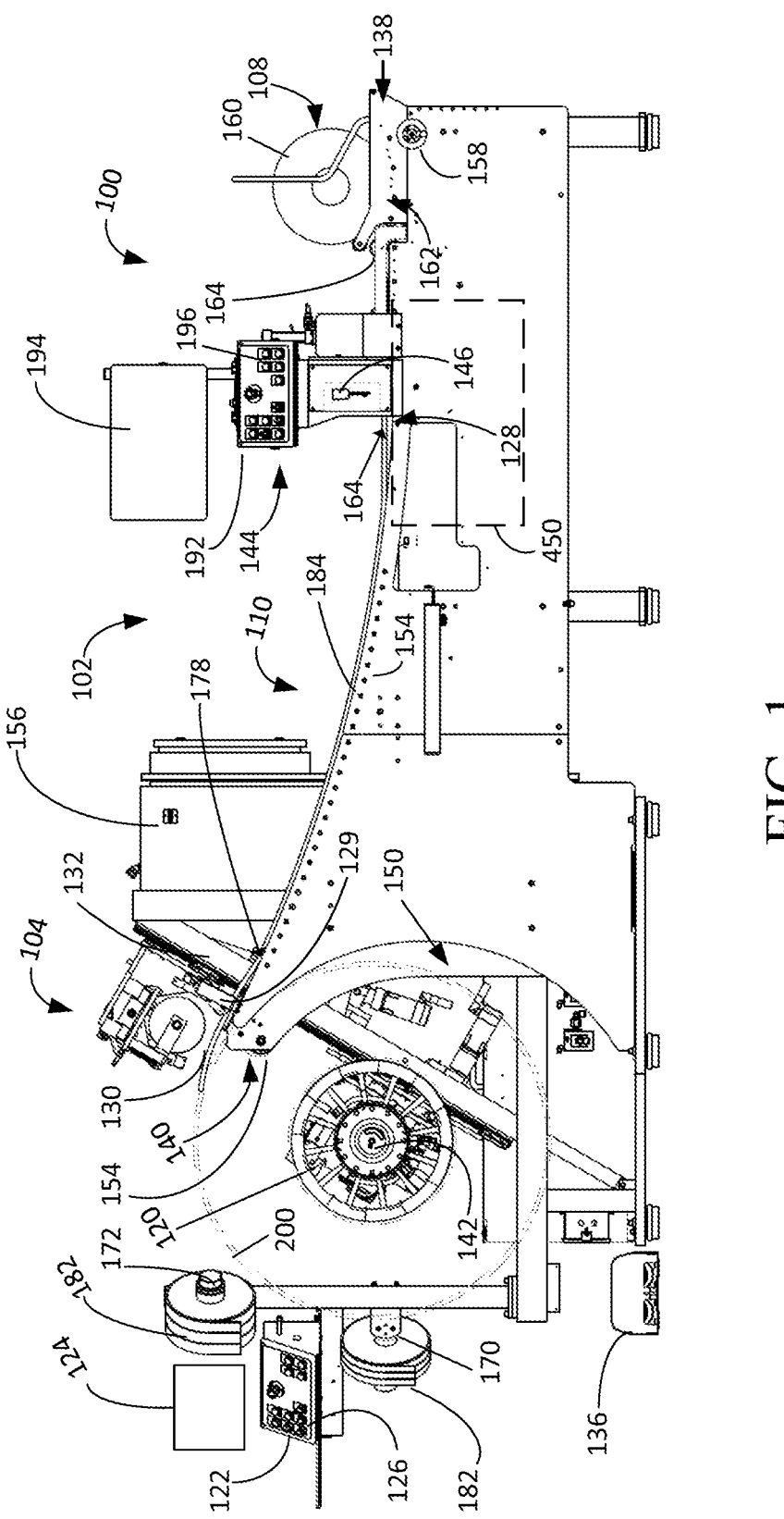
FIG. 1 is a side-view of an integrated tire bench system, according to an example embodiment.
Figure 2:
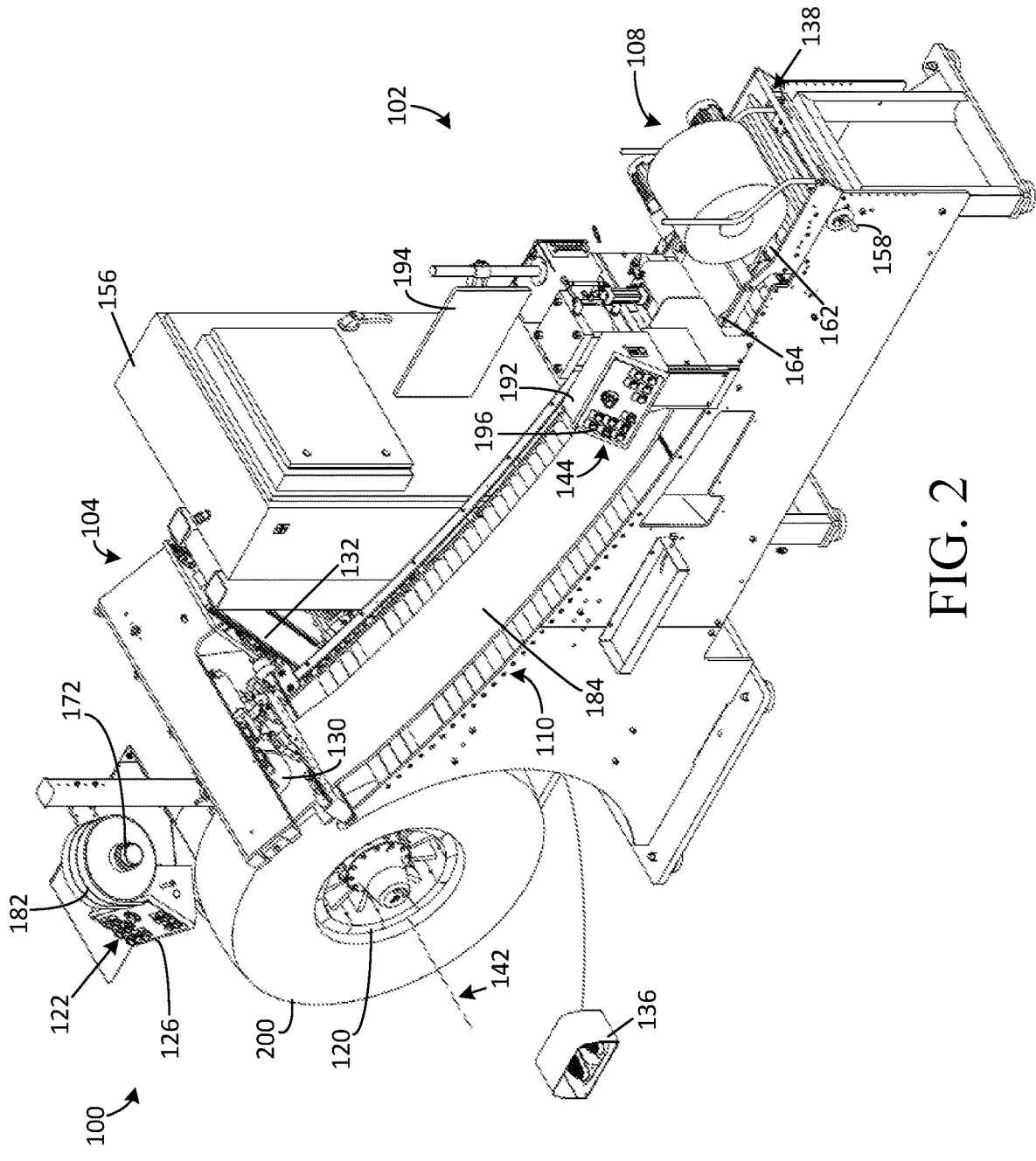
FIG. 2 is a perspective view of the integrated tire bench system of FIG. 1 without a set of rollers.
Figure 3:
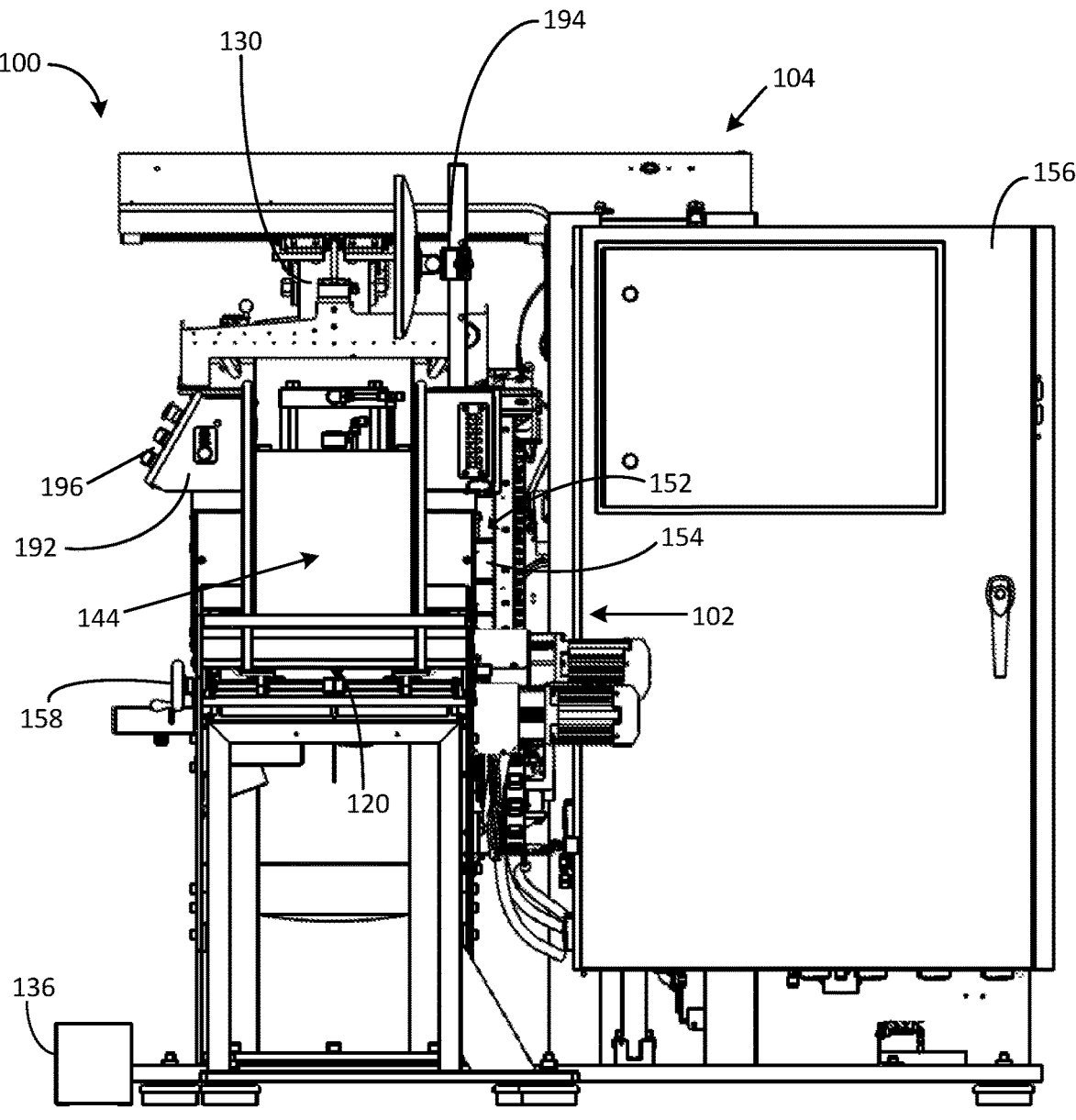
FIG. 3 is a front view of the integrated tire bench system of FIG. 1 without a tread roll.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to a tire bench that is a semi-automated retread tire building apparatus (e.g., tire tread cutting apparatus) configured to assemble retread tires. It is often desirable, for aesthetic and structural strength purposes, to match the tire tread design at each end of the tire tread length so that where the two ends of the tire tread length match at the splice, the repetitive pattern of the tire tread design is substantially continuous. To create such a splice, it may be necessary to stretch the tire tread around the circumference of the tire casing and cushion gum because the tire tread length may have been cut to an extra shortened length in order to cause the matching of the tire tread design at the two ends of the tire tread. The tire bench described herein is configured to allow for an operator to apply a tire tread to a tire casing before the applied tire tread is fully measured and cut. The embodiments described herein provide improvements over current retread tire systems and methods by allowing the operator to influence the location of the final cut on a trailing end (e.g., second end) to ensure design match with a leading end (e.g., first end) while still achieving length match and allow the final cut to occur as the tire tread is applied to the tire casing. In some embodiments, the tire bench described herein includes a tread cradle (e.g., tread track, tread drive system, etc.) with tread roller placement that minimizes the likelihood of j am of the tire tread along the tire tread track.

Generally, the tire bench system described herein is an integrated tread bench that combines the processes of casing measurement, tread measurement, tread cutting, and tread application into a single work bench machine while semi-automating the plurality of steps required to produce a finished retread tire prior to curing. The tire bench system includes an integrated semi-automatic method and apparatus for cutting an appropriate length of tire tread that allows for the application of the tire tread in a controlled stretch to a casing before the end of the applied tire tread is cut. In some embodiments, the tire bench system includes an integrated cushion gum application process and apparatus that controls the stretch of the cushion gum during application to the tire casing. In some embodiments, the integrated cushion gum application and the tire tread cutting and application allows for an applied cushion gum to produce a tire with a predetermined range of splice size such that the periodic tire tread design is substantially continuous in the retread tire.

Referring to FIGS. 1-4, a tire tread bench 100 that includes a rotatable tire hub 120 for mounting and measuring a tire casing 200, a tread dispensing system 102, a stitcher system 104, and a pair of duplicative (e.g., redundant) control systems 122, 192 for operating both is shown. In some embodiments, the tire hub 120 may be a variable size hub that incorporates an automated inflation system and is configured to accommodate tires having different sizes (e.g., widths and radii). Generally, the tire tread bench 100 is configured to position a tire casing 200—shown as broken lines in FIG. 1—on the tire hub 120 to allow for an operator to apply a tread section 184 to the tire casing 200 with cushion gum (or similar bonding layer) 180. The tire tread bench 100 allows an operator to apply the tire tread to the tire casing before the tire tread from the tread roll 160 is fully measured and cut. In some embodiments, the tire tread bench 100 is configured to allow an operator to apply cushion gum (or similar bonding layer) to a tire casing 200 before application of a tire tread from the tread roll 160 to the tire casing 200 without use of another system or apparatus.

Figure 6:
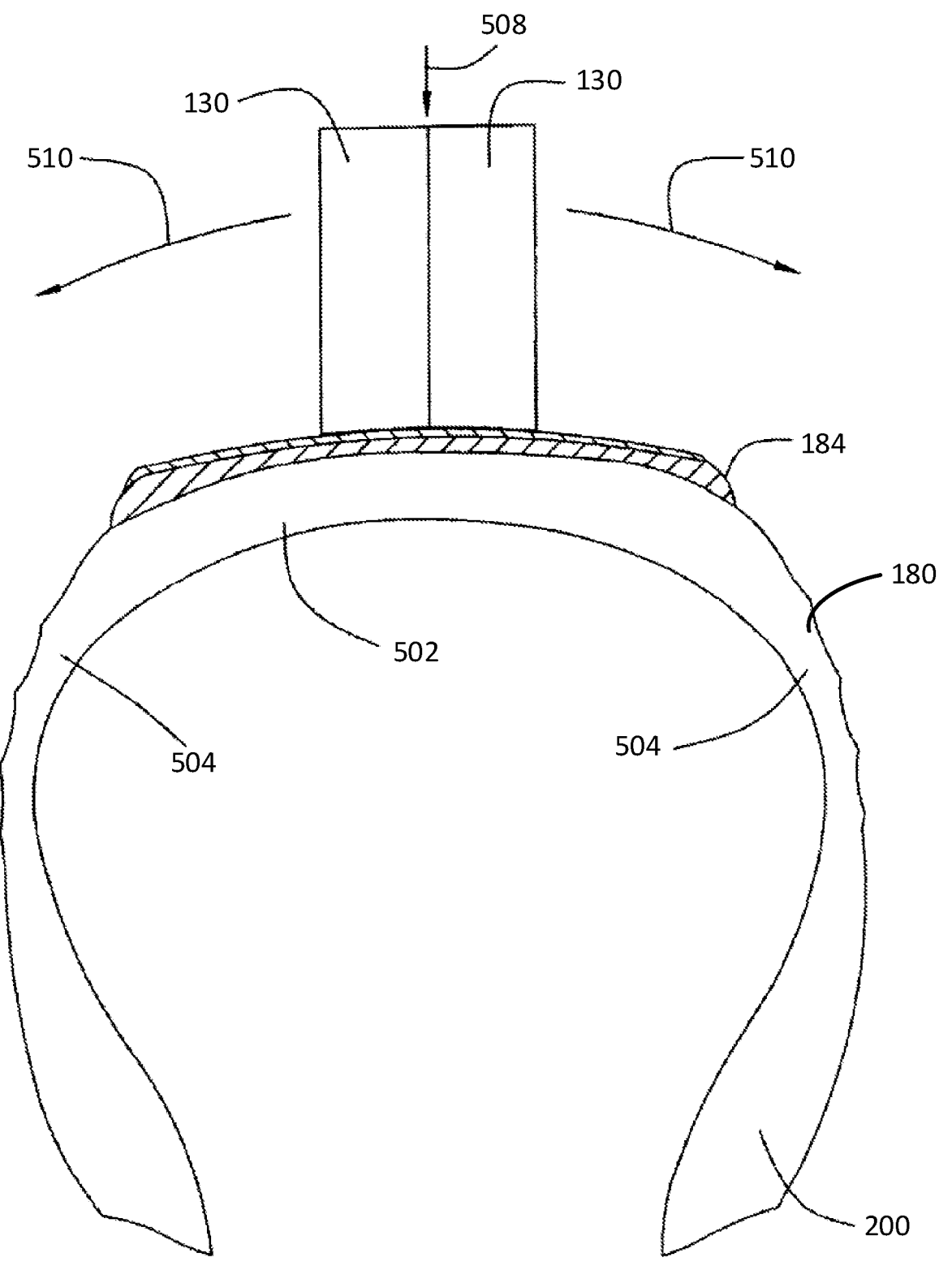
FIG. 6 is a cross-sectional view of a tire casing in a stitching operation.

The tire hub 120 is configured to receive the tire casing 200, facilitate inflation of the tire casing 200, and align the tire casing 200. In operation, an operator mounts the tire casing 200 to the tire hub 120. The tire hub 120 may be moved laterally along an axis of rotation 142 in order to center the tire hub 120 relative to a longitudinal center line of the tire tread bench 100. This movement is to center the tire casing 200 with the track 152 in order to center the tread section 184 on the tire casing 200. The tire hub 120 may be moved longitudinally along the axis of rotation 142 in order to center the tire hub 120 relative to an operator height. In some embodiments, the tire hub 120 may be moved longitudinally along the axis of rotation 142 in order to center the tire hub 120 relative to a lateral center line of the tire tread bench 100. The center line of the tire tread bench 100 corresponds to the center line of the tread roll 160 of the tread dispensing system 102. Once the tire casing 200 is mounted on the tire hub 120, the tire casing 200 is inflated and centered. Centering the tire casing 200 includes aligning the center line of the tire casing 200 with the center line of the tread roll 160. In some embodiments, the tire hub 120 is automatically aligned with the tire tread bench 100 centerline by a system of clamps (e.g., clamp element 129 as shown in FIG. 1), guides, rollers, or other alignment devices. In some embodiments, the tire casing 200 includes a layer of cushion gum 180 already applied—as shown in FIG. 6. In some embodiments, the tire casing 200 does not have a cushion gum 180 layer and the tire tread bench 100 is configured to apply a layer of cushion gum to the tire casing 200.

Once the tire casing 200 is positioned on the tire hub 120, a measurement system 150 is configured to determine the measurement of wheel circumference of the tire casing 200—and any layer of cushion gum—on the tire hub 120 for application and splicing of the tread around the tire casing 200. In some embodiments, the measurement system 150 includes at least one camera that is configured to monitor the surface of the tire casing 200 as it rotates around the axis of rotation 142 of the tire hub 120. In some embodiments, the camera or other visual (e.g., non-contact) device may be coupled to an encoding device which encodes the variation of the tire casing 200 for communication to a central processing unit or control unit. In some embodiments, the measurement system 150 is a measurement wheel with a measurement arm 52 that is pivotable by actuation through a pneumatic cylinder to engage a surface (either a tire casing, or cushion gum applied to a tire casing). In some embodiments, the measurement wheel rotates along the surface of the tire casing 200 as it rotates on an axis of rotation 142 allowing an encoding device coupled to the wheel to encode the angular variation of the measurement wheel for communication to a central processing unit or control unit. In some embodiments, the measurement system 150 is one or more lasers configured to identify circumferential locations along the tire casing 200 to determine the circumferential length of the tire casing 200. In some embodiments, the measurement system 150 is coupled to a control unit that yields appropriate measurement of wheel circumference. In some embodiments, other measurement devices are incorporated into the design without departing from the spirit and scope of the disclosure. In some embodiments, the measurement system 150 is configured to allow the operator to begin the tread application process before the measurement system 150 determines the wheel circumference. In some embodiments, the operator may begin dispensing tread from the tread roll 160 of the tread dispensing system 102.

The tread dispensing system 102 of the tire tread bench 100, as shown in FIGS. 1-4, is generally configured to dispense tread from the tread roll 160, along a track 152, to the tire casing 200 that is downstream and centered along the track 152. The tread dispensing system 102 includes a tread cradle 110 for dispensing a tread onto the tire casing 200 on the rotatable tire hub 120. The tread cradle 110 includes a track 152, the tread roll 160, a drive system 108, a set of rollers 154 along the track 152, and a cutting system 144. The tread cradle 110 is configured to facilitate the removal, application, and cutting of the tread section 184 having a leading end 186 and a trailing end 188. The tread roll 160, tread rollers 162, and drive rollers 164 define a tread dispenser.

An upstream operator control panel 192 is configured to control a drive system 108 of the tread rollers 162, drive rollers 164, cutting system 144, and/or other components of the tread dispensing system 102. As shown in FIG. 1, the upstream operator control panel 192 is near a bench end 138 downstream from the tread roll 160. The bench end 138 is adjacent to the tread roll 160. The upstream operator control panel 192 includes a plurality of buttons and gauges 196 to partially control and monitor operations of tire tread bench 100. The upstream operator control panel 192 is configured to be redundant to, and mirror, the control of the system of the downstream operator control panel 122. In other words, an operator of the tire tread bench 100 can control the drive system 108 of the tread rollers 162, drive rollers 164, cutting system 144, stitcher rollers 130, and/or other components of the tread dispensing system 102 from both the downstream operator control panel 122 and the upstream operator control panel 192. A monitor 194 is positioned above the upstream operator control panel 192 and is configured to provide visual feedback to an operator relating to the operation and dispensing of the tire tread from the tread roll 160. In some embodiments, the monitor 194 is configured to show an overlay of a cut location of the knife 146 on the tread section 184 to form the trailing edge 188. In some embodiments, the monitor 194 is connected to a camera that is positioned to provide visual feedback for alignment of the tire hub 120. In some embodiments, the monitor 194 is coupled to the measurement system 150 to provide feedback and information relating to the proper trailing end cutting location to generate the tread section.

Figure 4:
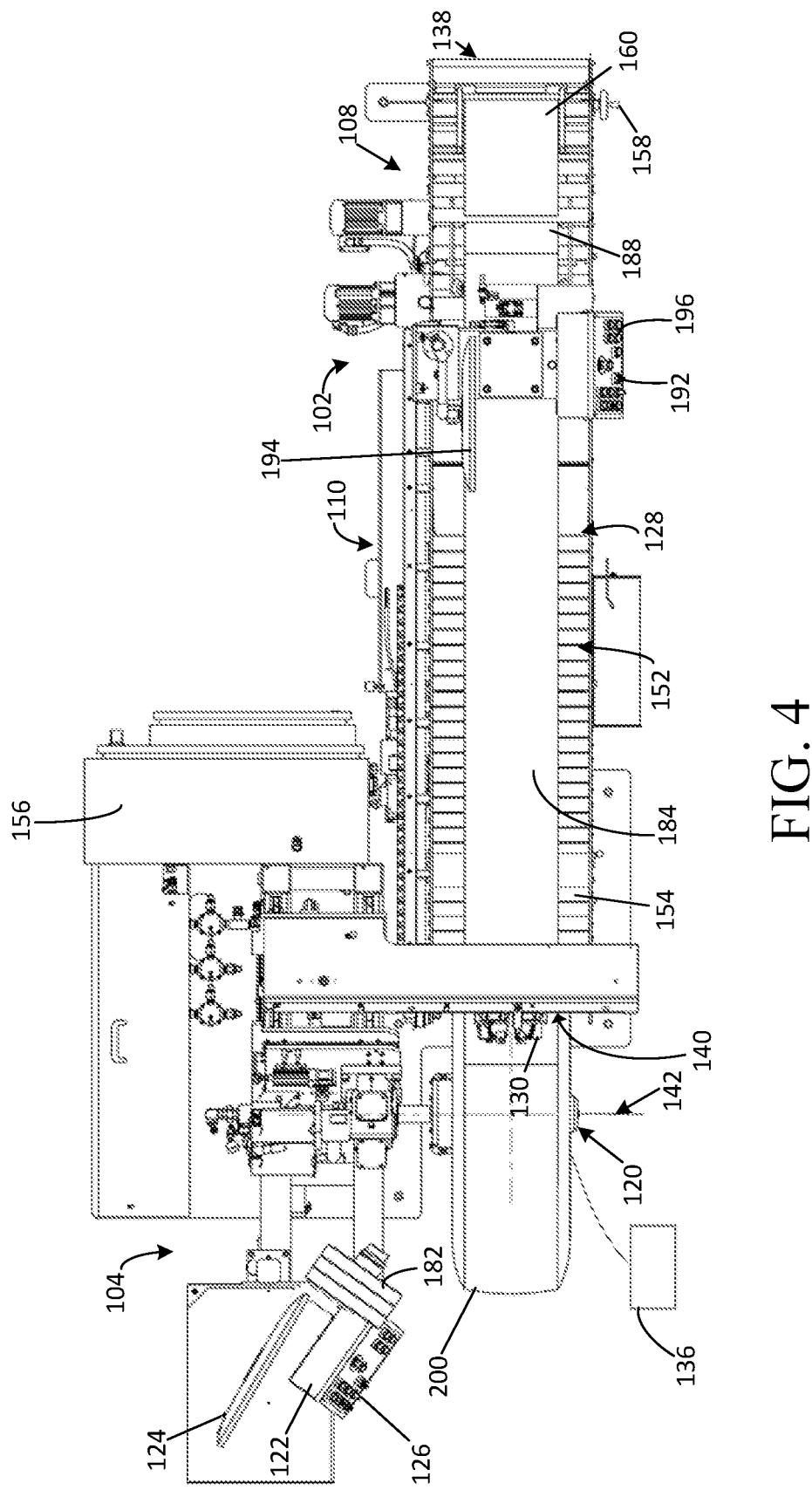
FIG. 4 is a top view of the integrated tire bench system of FIG. 1 with an additional track, according to an example embodiment.

The track 152 has a first track end 128 and a second track end 140. In some embodiments, the track 152 is a curved track. The first track end 128 is adjacent an outlet of the cutting system 144 and the second track end 140 is adjacent the tire hub 120. The tread roll 160 may be a two-piece tread roll. A set of rollers 154 (e.g., plurality of roller) are mounted along the track 152. In some embodiments, the set of rollers 154 are placed along the track 152 to minimize the occurrences of a jam caused by a two-piece tread roll. In some embodiments, the track 152 is configured as a curve to provide a desirable height for the operator to access at or near the knife 146. The knife 146 may be a guillotine style cutting device. The track 152 is also appropriately curved to allow a desirable height for operator access near knife 146 while providing adequate height at the opposite end to accommodate tires of large size. Additionally, the track 152 is configured as a curve to provide the tread section 184 such that the leading end 186 is applied to the tire casing 200 on the tire hub 120 before the trailing end 188 is cut by the cutting system 144. In other words, the track 152 is configured to deliver the tread section 184 to the end of track (e.g., second track end 140) adjacent the tire casing 200, for assembly thereon, without introducing any substantial bending or stretching caused by abrupt changes in the path of travel of the tread section 184. In other words, the leading end 186 of the tread section 184 is on the tire casing 200, downstream from an uncut trailing end 188, as the tread is driven off the tread roll 160, as shown in FIG. 4. In some embodiments, the track 152 is angled such that the tread can be applied tangentially to a crown of the tire casing 200. In other words, the approach angle of the tread is tangential to the surface of the crown of the tire casing 200. In some embodiments, the tire casing 200 is 52" (inches) or smaller.

Figure 5:
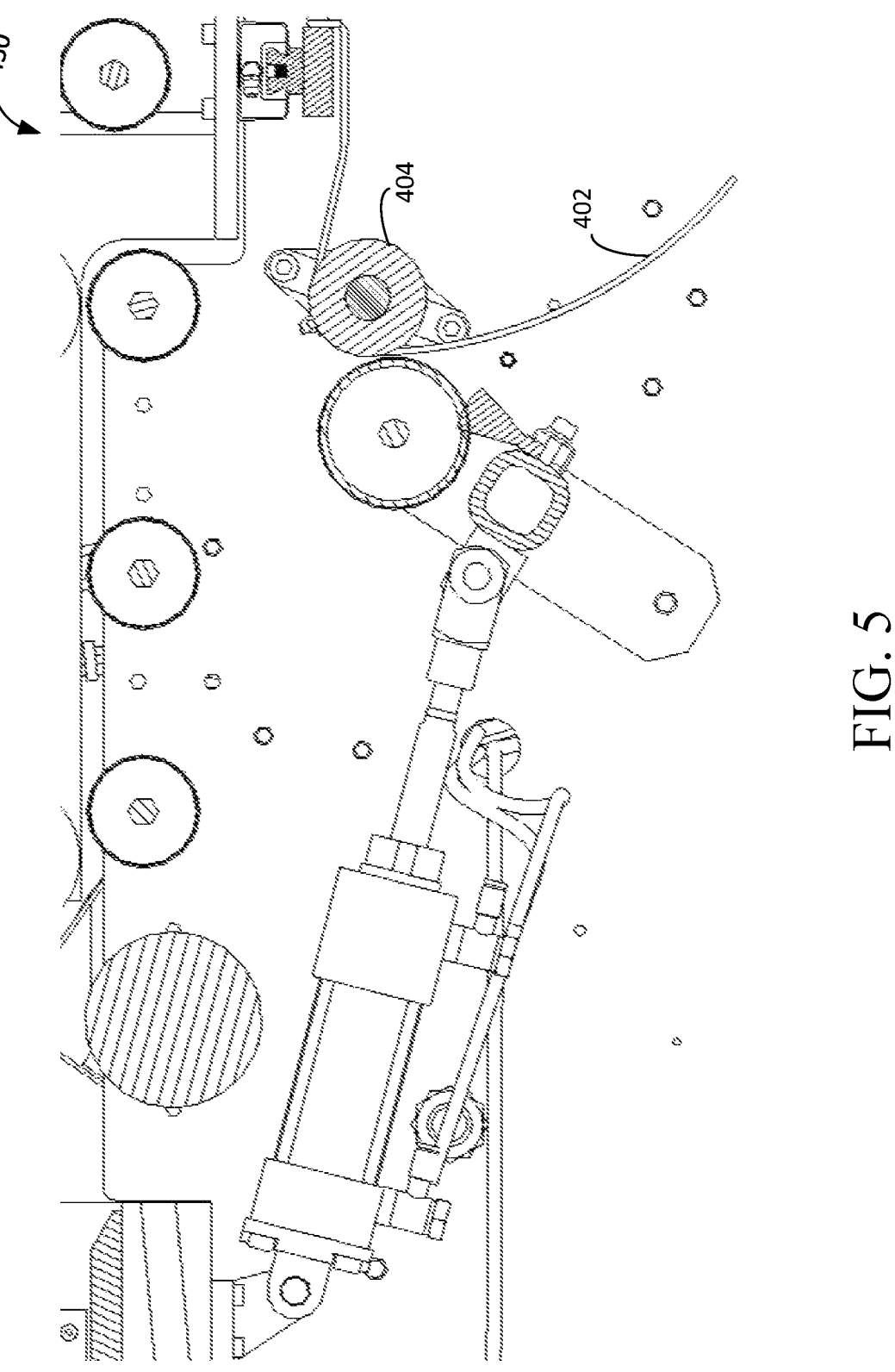
FIG. 5 is a detailed cross-sectional view of the integrated tire bench system shown at view window 450 of FIG. 1, according to an example embodiment.

As shown in FIGS. 1 and 4, the tread roll 160 is mounted to tread rollers 162 that are configured to drive tread sections from the tread roll 160 down the track 152. In some embodiments, the tread roller crank 158 may be positioned below the tread roll 160 and configured to drive tread sections from the tread roll 160 down the track 152. In some embodiments, an automatic drive system drives tread sections from the tread roll 160 down the track 152. In some embodiments, the automatic drive system is operably connected to a controller unit. In some embodiments, both an automatic drive system and a tread roller crank 158 may be used to drive tread sections from the tread roll 160 down the track 152. A set of drive rollers 164 are downstream (e.g., the second track end 140 is downstream from the bench end 138 and the bench end 138 is upstream the second track end 140) the tread roll 160 and are configured to pull the tread section 184 from the tread roll 160 and push out the tread section 184 away from drive rollers 164. In some embodiments, the drive rollers 164 include a grooved roller surface that is configured to better facilitate the movement of the tread section 184 downstream the track 152. In some embodiments, a wire guide 402, as shown in FIG. 5 which depicts a detailed cross section view of the integrated tire bench system shown at view window 450, may be implemented to minimize the occurrence of the tread section 184 or other material from being wound up on the grooved roller surface. In some embodiments, the wire guide 402 prevents tear or roll up from the tread roll 160 and may be configured to interact (e.g., go within) the groove on the roller. In some embodiments, the grooved rollers 404 are also positioned on the "take-up" portion of the track 152. In other words, the wire guide 402 form that is placed in the center of the grooved roller 404 keeps the polyethylene protective layer backing that is on the tread from wrapping around the take up roller.

As the tread section 184 travels along the track 152, an encoder 178 adjacent the second track end 140 measures the amount of tread that has passed over the encoder 178. In some embodiments, the encoder 178 is in communication with a central processing unit or control unit configured to track the location of the leading end 186 relative to the tread roll 160 (e.g., uncut trailing end 188) as the encoder 178 determines how much tread has passed off of the track 152 onto the tire casing 200. The encoder 178 is used to identify a potential trailing end 188 of the tread section 184 for a cutting system 144 to splice. In some embodiments, a fastening member may be coupled to the leading end 186 of the tread section 184 to facilitate the movement of the leading end 186 down the track 152. In some embodiments, the fastening member includes an encoder 178 in communication with a central processing unit or control unit configured to track the location of the leading end 186 relative to the tread roll 160 (e.g., uncut trailing end 188). In some embodiments, a substantially continuous monitoring system is implemented such that the upstream operator control panel 192 is configured to capture and provide a length of the tread section 184 (e.g., a tread section length) to the operator.

The cutting system 144 is positioned downstream of the tread roll 160 and is configured to cut a length of the tread section 184 from uncut tread from the tread roll 160. The cutting system 144 includes a knife 146 that is configured to cut the tread section 184. In some embodiments, the cutting system 144 and knife 146 are positioned at a desirable height for an operator to access the knife 146 while providing adequate height at the opposite end to accommodate tires of large size. In operation, the leading end 186 of the tread section 184 passes through the cutting system 144 and along the track 152, downstream, toward the tire casing 200 on the tire hub 120. In some embodiments, the cutting system 144 includes a tread length monitoring system that is configured to capture and determine the amount (e.g., length, width, etc.) of tread from the tread section 184 that has passed through the cutting system 144 toward the tire hub 120.

The stitcher system 104 includes a downstream operator control panel 122, a first spindle 170 with a binding cushion gum roll 182 thereon, a second spindle 172 with another, similar binding cushion gum roll 182 thereon, and stitcher rollers 130. Generally, the stitcher system 104 is configured to apply the new tread section 184 from the tread dispensing system 102 along the tire casing 200 on the rotatable tire hub 120. The stitcher system 104 is also configured to apply cushion gum between the leading end 186 and the trailing end 188 of the tread section 184 along the tire casing 200 on the rotatable tire hub 120 to form a continuous tread along the tire casing 200 (e.g., retreading the tire). In some embodiments, the stitcher system 104 is configured to apply cushion gum along the tire casing 200 on the rotatable tire hub 120. In some embodiments, the stitcher rollers 130 may also be configured to be stitcher and applicator rollers.

The downstream operator control panel 122 is configured to control a drive system 108 of the tread rollers 162, drive rollers 164, cutting system 144, the stitcher rollers 130, and/or other components of the tread dispensing system 102. The downstream operator control panel 122 is configured to be redundant to, and mirror, the control of the system of the upstream operator control panel 192. In other words, an operator of the tire tread bench 100 can control the drive system 108 of the tread rollers 162, drive rollers 164, cutting system 144, stitcher rollers 130, and/or other components of the tread dispensing system 102 from the upstream operator control panel 192. The operator may then move downstream toward the tire hub 120 and control the systems from the previous state from the downstream operator control panel 122. As shown in FIG. 1, the downstream operator control panel 122 is downstream from track 152. The downstream operator control panel 122 includes a plurality of buttons and gauges 126 to partially control and monitor operations of tire tread bench 100. A monitor 124 is positioned above the downstream operator control panel 122 and is configured to provide visual feedback to an operator relating to the operation and dispensing of the tire tread from the tread roll 160. In some embodiments, the monitor 124 is configured to show an overlay of a cut location of the knife 146 on the tread section 184 to form the trailing edge 188. In some embodiments, the monitor 124 is connected to a camera that is positioned to provide visual feedback for alignment of the tire hub 120. In some embodiments, the monitor 194 is coupled to the measurement system 150 to provide feedback and information relating to the proper trailing end cutting location to generate the tread section. In some embodiments, the monitor 124 is connected to a camera that is positioned to provide visual feedback for alignment of the tire hub 120. In some embodiments, a foot operation device 136 (e.g., foot pedal) that is configured to control one or more of the rotation of the first spindle 170, the second spindle 172, and/or the tire hub 120.

The stitcher rollers 130 are configured to perform stitching operations and application of the tread section 184 on tire casing 200 positioned on the tire hub 120. In some embodiments, the stitcher rollers 130 are movable along an stitcher track 132 to provide a force, such as in a direction indicated by arrow 508 in FIG. 4, onto the tread section 184 as the tread section 184 is placed over the tire casing 200, and the tire casing 200 is rotated about the tire hub 120. In some embodiments, the stitcher rollers 130 include a set of rollers that are movable relative to one another and may be moved adjacent one another to form a single stitcher roller 130. In some embodiments, the stitcher rollers 130 may also be moved in a direction substantially normal to the surface of the tire casing to apply a variably controlled force to the surface in contact with stitcher rollers 130. The stitcher rollers 130 may be coupled to a power operation device 156 configured to power and facilitate movement of the stitcher rollers 130.

Turning now to FIG. 6, the application of the tread section 184 on the tire casing 200 is shown. The tire casing 200 may be a tire casing similar to the tire casing 200 of FIG. 1. The tire casing 200 includes a curved crown section 502 and shoulders 504. The crown 502 is substantially the surface to which tread section 184 from the tread roll 160 is applied, as shown in FIG. 6. The stitcher rollers 130 apply pressure to the tread section 184 to stretch the tread section 184 on the tire casing 200 and allow for less of the tread section 184 to be used and to match tread design on the leading end 186 and trailing end 188. In some embodiments, the stitcher rollers 130 are configured to apply cushion gum and a polyethylene protective layer to the tire casing 200. In some embodiments, the polyethylene protective layer is structured to prevent adhesion to other layers of cushion gum while rolled and to prevent adhesion to the stitcher rollers 130 during application. In some embodiments, after the stitch operation is completed, the polyethylene protective layer is removed. In some embodiments, the tread section 184 is applied onto the tire casing 200 through controlled stretching—through the differential velocity introduced by the tire hub 120 spinning. For example, the tread may be compressed and stretched by the stitcher rollers 130, and thus able to be applied to the tire casing 200 on the tire hub 120, due to a differential velocity between a point surface of the tire casing 200 and a point on the surface of the tread.

Figure 7:
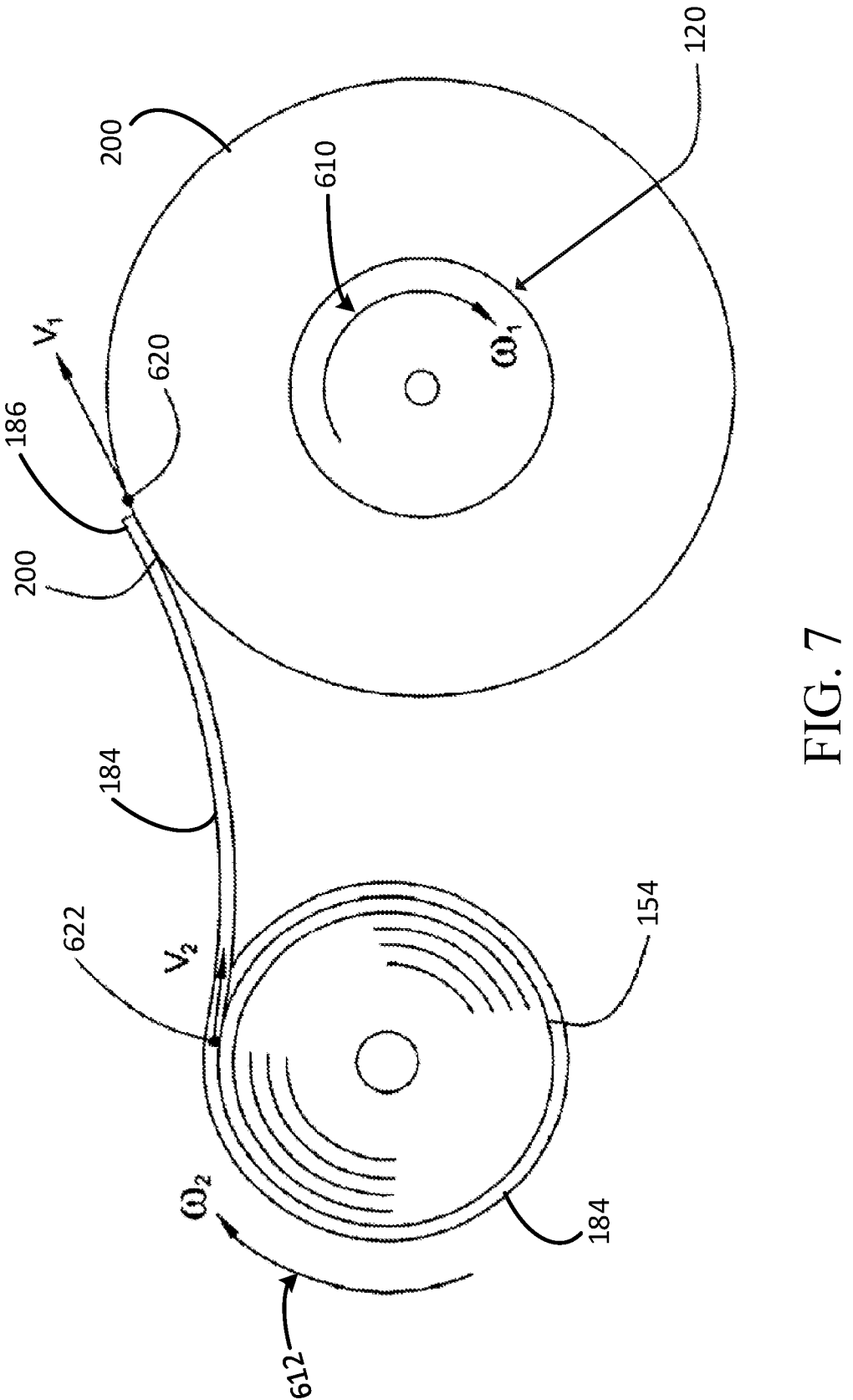
FIG. 7 is a side schematic of the kinematics of the tread application process.

Referring now to FIG. 7, a side schematic of the kinematics of a tread section application process is shown, according to an example embodiment. Tread from the tread roll 106 is shown being applied to a tire casing 200 on the tire hub 120. The tread may be compressed and stretched by the stitcher rollers 130, and thus able to be applied to the tire casing 200 on the tire hub 120, due to a differential velocity between a point 620 surface of the tire casing 200 and a point 622 on the surface of the tread section 184 coming off of a roller 154 along the second track end 140. As shown in FIG. 7, the tread section 184 coming off of a roller 154 has an angular velocity $\omega2$ 612 and the tire hub 120 has an angular velocity $\omega1$ 610, such that the tire casing 200 has the angular velocity $\omega1$ 610. To cause stretching of the tread section 184 coming off of a roller 154, the point 620 on the surface of tire casing 200 has a velocity V1 and the point 622 on the tire tread being dispensed, has a velocity V2. A differential velocity $\Delta V=V1-V2$ that is non-negative is created because $\omega1$ 610 and $\omega2$ 612 are geared to provide different V2 and V1, where V1 is greater than V2. Therefore, due to the differential velocity, the tread section 184 coming off of a roller 154 is necessarily stretched and wrapped around the tire casing 200 as the tire casing 200 rotates with the rotation of the tire hub 120. In some embodiments, during tire tread application, it is desirable to provide a constant maximum velocity across the range of sizes. In some embodiments, a maximum tangential velocity of the points (e.g., point 620) along the surface of the tire casing 200 is achieved for a wide variety (e.g., widths and radii) for casings as the maximum tangential velocity is constant across the range of sizes. In some embodiments, the tangential velocity of the points (e.g., point 620) along the surface of the tire casing 200 are varied-based on the size of the tire casing 200—during tire tread application to provide a constant angular velocity over the range of sizes. In some embodiments, the application of the tread section 184 onto the tire casing 200 is substantially different from the application of the tire tread process shown in FIG. 7.

As the tread section 184 is being applied to the tire casing 200, the stitcher rollers 130 are moved to engage and provide a force onto the tread section 184 along the tire casing 200. Tire casing 200 is rotated about the tire hub 120 while stitcher rollers 130 provide a force (e.g., a force in a direction indicated by arrow 508 in FIG. 6) onto the tread section 184. In some embodiments, the stitcher rollers 130 begin in the middle of crown section 502 and, during subsequent rotations, the stitcher rollers 130 are moved toward shoulders 504 of crown section 502 in the directions indicated by arrows 510. This operation, often referred to as stitching, provides adherence of the tread section 184 to the surface of the cushion gum 180 on the tire casing 200 (e.g., crown section 502 and shoulders 504), while aiding in removing any trapped air pockets between cushion gum 180 and the tire casing 200.

In embodiments where the tire tread bench 100 is configured to apply a layer of cushion gum 180 onto the bare tire casing 200, the first spindle 170 and/or the second spindle 172 are coupled to one or more drive wheels that are configured to engage the surface of a tire casing 200 and is driven by the rotation of tire hub 120. In some embodiments, the drive wheel is connected to the first spindle 170 and/or second spindle 172 via a system of gears and/or belts, such that first spindle 170 and/or second spindle 172 rotates with a surface velocity that is proportional to the surface velocity with which tire casing 200 is rotated by a drive system that rotates the tire hub 120. In some embodiments, the drive wheel is connected to the first spindle 170 and/or second spindle 172 via a pneumatic system such that first spindle 170 and/or second spindle 172 rotates with a surface velocity that is proportional to the surface velocity with which tire casing 200 is rotated by a drive system that rotates the tire hub 120. In some embodiments, the stitcher rollers 130 are configured to perform stitching operations and application of cushion gum on tire casing positioned on the tire hub 120. In some embodiments, the tire tread bench 100 is configured to provide improved conformity of cushion gum 180 to the contoured crown 502 of tire casing 200. The improved conformity provides uniform adhesion and contact of cushion gum 180 to the crown 502 causing the cushion gum edge to substantially contact the tire casing 200 wrinkle-free, thereby further reducing the need for providing extra strips of cushion gum along shoulders 504 of crown 502 (e.g., cushion gum stripping). In some embodiments, the tire hub 120 is moved along a diagonal axis of a hub track to position the tire casing adjacent either the binding cushion gum rolls 182.

Turning back to FIGS. 1-4, the tread cradle 110—and the track 152—of the tire tread bench 100 is configured such that the leading end 186 of the tread section 184 is applied to the tire casing 200 before the trailing end 188 is determined and/or cut by the knife 146 of the cutting system 144. In other words, the application of the leading end 186 and other portions of the tread section 184 onto the tire casing 200 occurs before the tread section 184 is fully measured and cut. As the leading end 186 contacts the tire casing 200, the tire hub 120 is rotated while the stitcher rollers 130 provide a variably controlled pressure to the tread section 184 on the surface of the tire casing 200. The applied pressure by the stitcher rollers 130 provide adherence of the leading end 186 and tread section 184 to the layer of cushion gum 180 and extend the overall length of the tread due to the force being exerted by the stitcher rollers 130 and the associated Poisson effect.

A desired length of the tread section 184 may be determined based on the measured circumference of tire casing 200 with the layer of cushion gum 180 adhered thereto. The determined length and the length of the tread section 184 dispensed is monitored. Because the location of leading end 186 and the circumference of tire casing 200 with the layer of cushion gum 180 is known, the circumferential distance yet to be covered by the tread section 184 is able to be determined. By comparing the remaining circumferential distance to be covered and the amount of tread not yet applied, an appropriate force may be commanded to be applied by the stitcher rollers 130 to provide the appropriate amount of stretching and ultimately to match the leading end 186 with the yet to be cut trailing end 188. Once the trailing end 188 is cut, the tire tread bench 100 may monitor, determine, and adjust the force applied by the stitcher rollers 130 to provide the appropriate amount of stretching and ultimately to match the cut leading end 186. In some embodiments, the tire tread bench 100 may leave a gap having a gap length falling within a predetermined range.

As the determined length is dispensed from tread roll 160—and the tread section 184 including the leading end 186 are applied to the tire casing 200—the operator is able to identify the potential trailing end 188 of the tread section 184. The operator can influence the location of the final cut of the trailing end 188 to ensure tread design (e.g., tread pattern, tread grooves, etc.) match with the leading end 186 while still achieving length match of the tread section. In some embodiments, a stopping element may engage when the desired length of the tread section 184 is being dispensed from the tread roll 160 by the tread rollers 162 or in contact with the drive rollers 164. In some embodiments, the stopping element may be an alert on one or both of the monitors 124, 194 on the tire tread bench 100. In some embodiments, the stopping element is a physical element that is extended upwardly above the track 152. In some embodiments, the stopping element is a command to the drive roller 164 to stop dispending tread from the tread roll 160.

In some embodiments, the downstream operator control panel 122 is operably connected to the upstream operator control panel 192 such that an operator is able to control the cutting system 144 and/or drive system 108 from the downstream operator control panel 122. In some embodiments, the monitor 124 may be configured to replicate the display on the monitor 194. In some embodiments, an operator is able to be positioned adjacent the tire hub 120 monitoring the application of the tread section 184 on the tire casing 200 and monitor the length and tire tread design of the tread section 184 through the cutting system 144. When the desired length and/or tread design is reach by the potential trailing end 188, the operator—from the downstream operator control panel 122—is able to cause the knife 146 to cut the trailing end 188 of the tread section 184. The tire tread bench 100 is configured to allow an operator to make minor adjustments to a location of the cut of the trailing end 188 of the tread section 184 to match the periodically repeating tread design of the leading end 186 with the tread design at the trailing end 188 such that when the trailing end 188 is adhered to the tire casing 200 and abutting the leading end 186, the pattern is substantially continuous.

Matching the designs of the leading end 186 and trailing end 188 at the splice region in a completed retread tire provide a continuously repeating tread design substantially unbroken by the splice for structural strength and aesthetic appeal. For example, the tread design may have a first pattern end and a second pattern end such that placement of the first pattern end on the second pattern end forms a repeating, substantially continuous pattern on the tread design. In some embodiments, the tire tread bench 100 includes an automated system that automatically identifies the proper leading end 186 location-based on tread design and desired length of the tread section 184—and engages the knife 146 to splice the tread. In some embodiments, the cutting determination is controlled by and operably connected to a controller unit. Once the tread section 184 is coupled to the tire casing 200, the tire casing 200 is removed from the tire hub 120 and cured. In some embodiments, the finished tire casing 200 (e.g., tire casing 200 with a layer of cushion gum 180 and a tread section 184) is placed in a pressurized flexible envelope for curing.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "downstream" is used to denote a system, apparatus, element, and/or component that occurs later on in a production sequence or production line compared to other systems, apparatuses, elements, and/or components. The term "upstream" is used to denote a system, apparatus, element, and/or component that occurs earlier on in a production sequence or production line compared to other systems, apparatuses, elements, and/or components.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the present disclosure as recited in the appended claims. In some embodiments, the term "substantially" refers to a variance of ten-percent. The term "approximately" when used with respect to values means plus or minus five percent of the associated value.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. Additionally, the term "radially inner" refers to an element that is closer to the axis of rotation than is a "radially outer" element. The terms "axially inward" and "axially inwardly" refer to a general direction towards the equatorial plane of the tire, whereas "axially outward" and "axially outwardly" refer to a general direction away from the equatorial plane of the tire and towards the sidewall of the tire.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this his specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of cutting a length of tire tread for a retread tire having a tire casing positioned on a tire hub, the tire casing having a layer of cushion gum applied thereto, the method comprising:

dispensing tire tread from a tread dispenser along a track upstream of the tire hub, the tire tread having a first tread end and a tread length, the tread length defined by a distance between the first tread end and a tire tread roll upstream of the tread dispenser;

conveying the first tread end toward the tire casing along the track;

adhering the first tread end of the tire tread to an outer surface of the tire casing and the layer of cushion gum;

rotating the tire casing and cushion gum to adhere the tire tread to the tire casing;

measuring, while the tire casing and the layer of cushion gum are rotating to adhere the tire tread to the tire casing, a circumference of the tire casing and the layer of cushion gum;

determining a second tread end based on the measured circumference; and after adhering the first tread end of the tire tread to the tire casing and the layer of cushion gum, cutting the tire tread at the second tread end to define a section of tire tread, wherein the section of tire tread is defined by the first tread end adhered to the tire casing and the second tread end.

2. The method of claim 1, further comprising:

conveying the second tread end along the track toward the tire casing with the first tread end adhered thereto;

adhering the section of tire tread to the tire casing; and adhering the second tread end to the tire casing such that the second tread end abuts the first tread end.

3. The method of claim 2, wherein the tire tread has a repeating tread pattern such that when the second tread end is adhered to the outer surface of the tire casing, the second tread end abuts the first tread end on the tire casing and the tread pattern at the second tread end substantially matches the tread pattern at the first tread end.

4. The method of claim 1, wherein the tire tread comprises a repeating tread pattern, each tread pattern having a first pattern end and a second pattern end such that abutting the first pattern end and the second pattern end defines a continuous tread pattern, and wherein the first tread end has the first pattern end, and wherein determining the second tread end comprises identifying a portion of the tire tread that has the second pattern end.

5. The method of claim 1, further comprising communicating the measured circumference from a measuring device configured to measure the circumference of the tire casing and the layer of cushion gum positioned on the tire hub to a control unit connected to the tread dispenser and operably connected to the measuring device and displaying a location of the second tread end on a display unit.

6. The method of claim 1, further comprising communicating the measured circumference from a measuring device configured to measure the circumference of the tire casing and the layer of cushion gum positioned on the tire hub to a control unit connected to the tread dispenser and operably connected to the measuring device, and controlling, by the control unit, the cutting of the tire tread at the second tread end to define the section of tire tread, the control unit further configured to cause the tire hub to rotate so as to rotate the tire casing.

7. The method of claim 1, wherein the track comprises a plurality of rollers positioned between a first track end and a second track end downstream of the first track end, wherein at least one roller of the plurality of rollers comprises a groove along a surface of the at least one roller, wherein the at least one roller is adjacent the second track end.

8. The method of claim 1, wherein conveying the section of tire tread along the track to the tire casing is caused by propelling the first tread end of the tire tread, the first tread end being conveyed to the tire casing without subjecting the tire tread to any substantial bending.

9. A method of cutting a length of tire tread for a retread tire having a tire casing positioned on a tire hub, the tire casing having a layer of cushion gum applied thereto, the method comprising:

dispensing tire tread from a tread dispenser along a track upstream of the tire hub, the tire tread having a first tread end;

conveying the first tread end toward the tire casing along the track;

adhering the first tread end of the tire tread to an outer surface of the tire casing and the layer of cushion gum;

rotating the tire casing and the layer of cushion gum to adhere the tire tread to the tire casing while applying pressure to the tire tread with a stitcher roller;

measuring, while the tire casing and the layer of cushion gum are rotating to adhere the tire tread to the tire casing, a circumference of the tire casing and the layer of cushion gum; and cutting the tire tread at a second tread end determined based on the measured circumference to form a section of tire tread.

\* \* \* \* \*